United States Patent
Wei et al.

(10) Patent No.: US 6,363,746 B1
(45) Date of Patent: Apr. 2, 2002

(54) METHOD AND APPARATUS FOR MAKING MULTI-COMPONENT GLASS SOOT

(75) Inventors: Huailiang Wei, Horseheads; Lisa A. Moore; Jeffery L. Blackwell, both of Corning; Daniel W. Hawtof, Painted Post, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/525,409

(22) Filed: Mar. 15, 2000

(51) Int. Cl.$^7$ ............................................. C03B 19/06
(52) U.S. Cl. ........................ 65/17.4; 65/413; 65/418; 65/530; 65/531; 431/10; 431/187; 239/416.5; 239/421; 239/422; 239/423; 239/424; 239/424.5; 239/429; 239/430
(58) Field of Search ................... 65/17.4, 413, 418, 65/530, 531; 431/10, 187; 239/416.5, 421, 422, 423, 424, 424.5, 429, 430

(56) References Cited

U.S. PATENT DOCUMENTS

| 4,165,223 A | | 8/1979 | Powers |
|---|---|---|---|
| 4,336,049 A | | 6/1982 | Takahashi et al. |
| 4,604,118 A | * | 8/1986 | Bocko et al. .................. 65/531 |
| 4,801,322 A | | 1/1989 | Suda et al. |
| 5,599,371 A | * | 2/1997 | Cain et al. |
| 5,962,606 A | * | 10/1999 | Williams et al. .......... 239/424.5 |
| 6,075,101 A | * | 6/2000 | Lynn et al. ............... 239/424.5 |

FOREIGN PATENT DOCUMENTS

| JP | 58-2171 | * | 1/1983 |

* cited by examiner

Primary Examiner—Michael Colaianni
(74) Attorney, Agent, or Firm—Price, Heneveld, Cooper, DeWitt & Litton

(57) ABSTRACT

An apparatus for producing the glass soot used in the formation of optical fiber includes a burner with an internal atomizer. The atomizer includes an outer tube having a nozzle at an end thereof, and an inner tube located within the outer tube and having a closed end restricting fluid flow therethrough and defining a cylindrical sidewall having radially extending apertures spaced there along. The outer tube receives the glass-forming mixture in liquid form and the inner tube receives an atomizing gas which flows through the apertures in the sidewall of the inner tube and atomizes the glass-forming mixture as the glass-forming mixture travels through the outer tube.

31 Claims, 3 Drawing Sheets

METHOD AND APPARATUS FOR MAKING MULTI-COMPONENT GLASS SOOT

BACKGROUND OF THE INVENTION

1. Field of the Invention

The present invention relates to an atomizer for use in producing preforms used to produce optical waveguide fibers either directly or through the intermediate production of a core cane.

2. Technical Background

Signal attenuation is a major factor in the design of communication systems incorporating optical fibers. Transmission losses limit the distance between receivers.

The specific material characteristics which are desired to minimize intrinsic optical attenuation are 1) a large energy gap to minimize absorption in the red and near infrared spectra due to the tail of the ultraviolet absorption band, 2) a low glass transition temperature to minimize density fluctuation scattering and reducing the broadening of the ultraviolet absorption band, and 3) in compound glasses, components with well matched dye element properties to minimize scattering from composition fluctuations. Although fused silica has the beneficial characteristics of a large energy gap and the lack of compositional fluctuations because it is a single component, it has an undesirable high glass transition temperature when compared with many compound glasses.

Many high vapor pressure source compounds that contain elements which provide beneficial properties by decreasing attenuation when incorporated into optical waveguide fibers are exceedingly difficult to make, are excessively expensive, and/or are difficult to handle. These drawbacks make it very difficult to effectively incorporate elements such as alkalis, alkaline-earths and rare earths into the resultant optical waveguide fibers.

As an alternative to employing low vapor pressure compounds, and in order to generate sufficient vapor pressures from the compounds containing the beneficial elements noted above, very high temperatures may be used within an associated burner employed to vaporize such components. However, such elevated temperatures are not compatible with conventional vapor deposition equipment and the production of low loss fibers. An alternative way to deliver low vapor pressure compounds is to spray these compounds directly into the combustion zone in the form of liquid droplets.

In the production of optical waveguide fibers, conventional chemical labor deposition methods such as vapor axial deposition (VAD), modified chemical vapor deposition (MCVD) and outside vapor deposition (OVD) use source compounds, such as chlorides of silicon ($SiCl_4$) and germanium ($GeCl_4$). The source compounds are converted into vapor form using either bubblers or evaporators. The vapor is then transported into a flame and reacted with oxygen to form oxide soot particles. These particles are collected on a rotating starting rod or bait tube in the case of VAD or a rotating mandrel in the case of OVD. In some OVD systems, the cladding portion of the preform is deposited on a previously formed core preform or core cane, rather than a mandrel.

In order for liquid or solution droplets to be converted into solid particles and then deposited on the target, the droplets must evaporate and combust with oxygen to form particles which are then captured on the target. The combustion, size and surface quality of the soot preform are dictated by the particle forming process and capture mechanisms.

Numerous burner designs have been developed for use in such processes, examples of which can be found in Powers U.S. Pat. No. 4,165,223 and Cain et al. U.S. Pat. No. 5,599,371. One of the problems associated with many burner designs is the clogging of the orifices of the face plate of the burners by soot particles. In particular, Suda et al. U.S. Pat. No. 4,801,322 discloses the problem of soot particles adhering to the orifices of a burner.

Another problem often encountered is the clogging of the main orifice of external air-assisted atomizers. External air-assisted atomizers require small exit orifices so that the exiting stream of glass-forming liquid can be effectively sheared by the associated atomizing gas. The relative size of the exiting orifice associated with external air-assisted atomizers as compared to the size of the droplets frequently results in blockage problems of the orifice.

A solution is needed therefore which allows the delivery of low vapor pressure source compounds into a high temperature reaction/combustion zone and converting these compounds into the desired multi-component glass soot, while limiting the adverse effect of soot buildup over and blockage of the orifices of the burner face plate and the exiting orifice of an atomizer associated with the burner system.

SUMMARY OF THE INVENTION

One aspect of the present invention is to provide an apparatus for producing a glass soot used in the formation of optical fiber that includes a burner having an internal air-assisted atomizer located within the burner. The atomizer includes an outer tube having a nozzle at an end thereof, and an inner tube located within the outer tube and having a closed end restricting fluid flow therethrough and defining a cylindrical sidewall having a plurality of radially extending apertures. The outer tube receives the glass-forming mixture in liquid form, while the inner tube receives an atomizing gas. The atomizing gas flows through the apertures in the sidewall of the inner tube and atomizes the glass-forming mixture as the glass-forming mixture travels through the outer tube.

Another aspect of the invention is a method for producing a glass soot used in the formation of optical fiber, including providing a burner that includes an internal air-assisted atomizer that includes an outer tube having a droplet-emitting first region, and an inner tube located within the outer tube and having a closed end and a cylindrical wall having a plurality of radially extending apertures. The method also includes supplying a glass-forming mixture to the outer tube of the atomizer, and supplying an atomizing gas to the inner tube, such that the atomizing gas flows through the apertures of the inner tube and enters orthogonally to the flow of the glass-forming mixture within the outer tube, thereby atomizing the glass-forming mixture within the outer tube.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENT

For purposes of the description, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting unless the claims expressly state otherwise.

Figure 1:
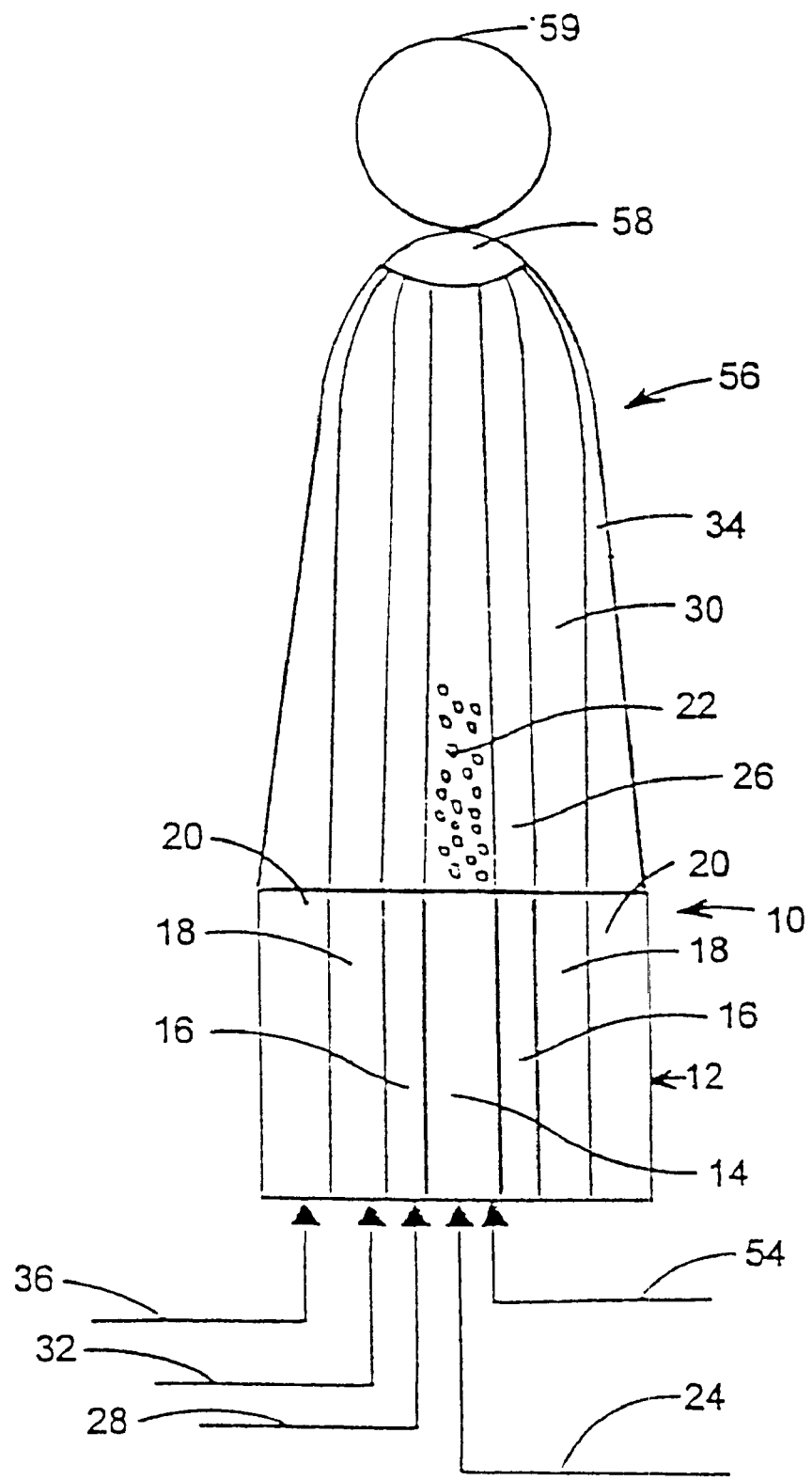
FIG. 1 is a schematic view of a burner system of the present invention.

Referring initially to FIG. 1, there is shown a burner system 10 for making multi-component glass soot and embodying the method and structure of the present invention. Burner system 10 includes a burner 12 with a droplet-emitting first region 1 4, a gas-emitting second region 16 concentrically surrounding first region 14, a gas-emitting third region 18 concentrically surrounding second region 16, and a gas-emitting fourth region 20 concentrically surrounding third region 18. The first region 14 which extends along the center axis of burner system 10 emits droplets of a glass-forming mixture 22 of a low vapor pressure compound from a source 24. The second region 16 emits an inert shielding curtain of gas 26 such as nitrogen, helium or argon from a source 28. The third region 18 emits a curtain of oxygen gas 30 from a source 32, while the fourth region 20 emits a combination of oxygen and a combustible gas 34 from a source 36. Burner system 10 also includes a combustion area 56 (FIG. 1) that is in communication with first region 14, second region 16, third region 18 and fourth region 20. Glass-forming mixture 22 is vaporized and oxidized within combustion area 56 and converted into a glass soot 58 which is directed on onto bait rod 59.

Figure 2:
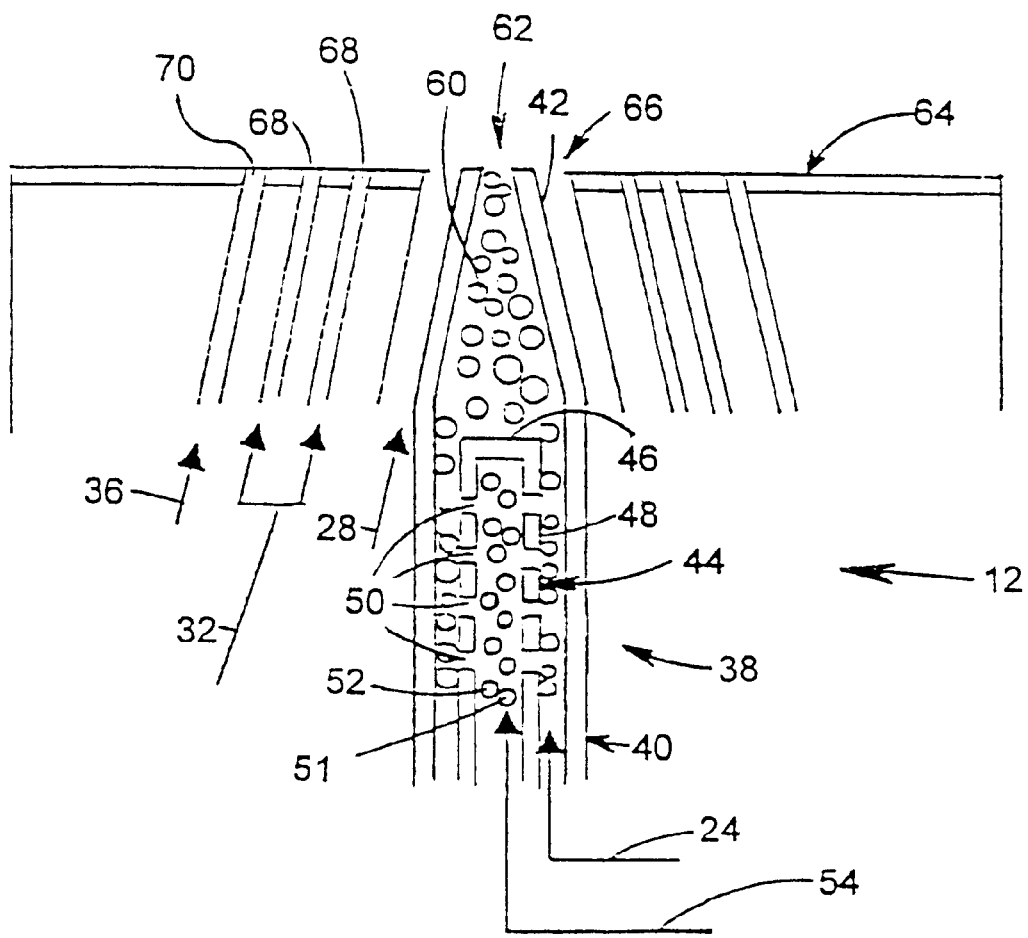
FIG. 2 is an enlarged vertical cross sectional fragmentary schematic view of the burner of the burner system including a schematic view of an atomizer.

As seen in FIG. 2, burner 12 includes an air-assisted atomizer 38 centrally located within burner 12. Atomizer 38 includes an outer tube 40 having a conical nozzle 42 located at an end thereof. Atomizer 38 also includes an inner cylindrical tube 44 located concentrically within outer tube 40 and having a closed end 46 that restricts fluid flow therethrough. Inner tube 44 includes a cylindrical sidewall 48 having a plurality of holes or apertures 50 extending radially therethrough. Outer tube 40 receives a glass-forming mixture 22 in liquid form, while inner tube 44 receives a pressurized atomizing gas 52 such as nitrogen or oxygen from a source 54. The atomizing gas 52 flows through holes 50 in sidewall 48 of inner tube 44 and atomizes the glass-forming mixture 22 as the glass-forming mixture 22 travels through outer tube 40 and before the glass-forming mixture 22 reaches nozzle 42 of outer tube 40.

As seen in FIG. 2, burner 12 is a precision atomizing burner similar to that disclosed in U.S. Pat. No. 5,599,371, the relevant parts of which are incorporated herein by reference. Atomizer 38 delivers solution droplets 60 to a centrally located aperture 62 in a face plate 64 of burner 12 and into combustion area 56 (FIG. 1). The glass-forming mixture 22 is originally delivered to outer tube 40 of atomizer 38 in the form of a liquid from source 24.

Figure 3:
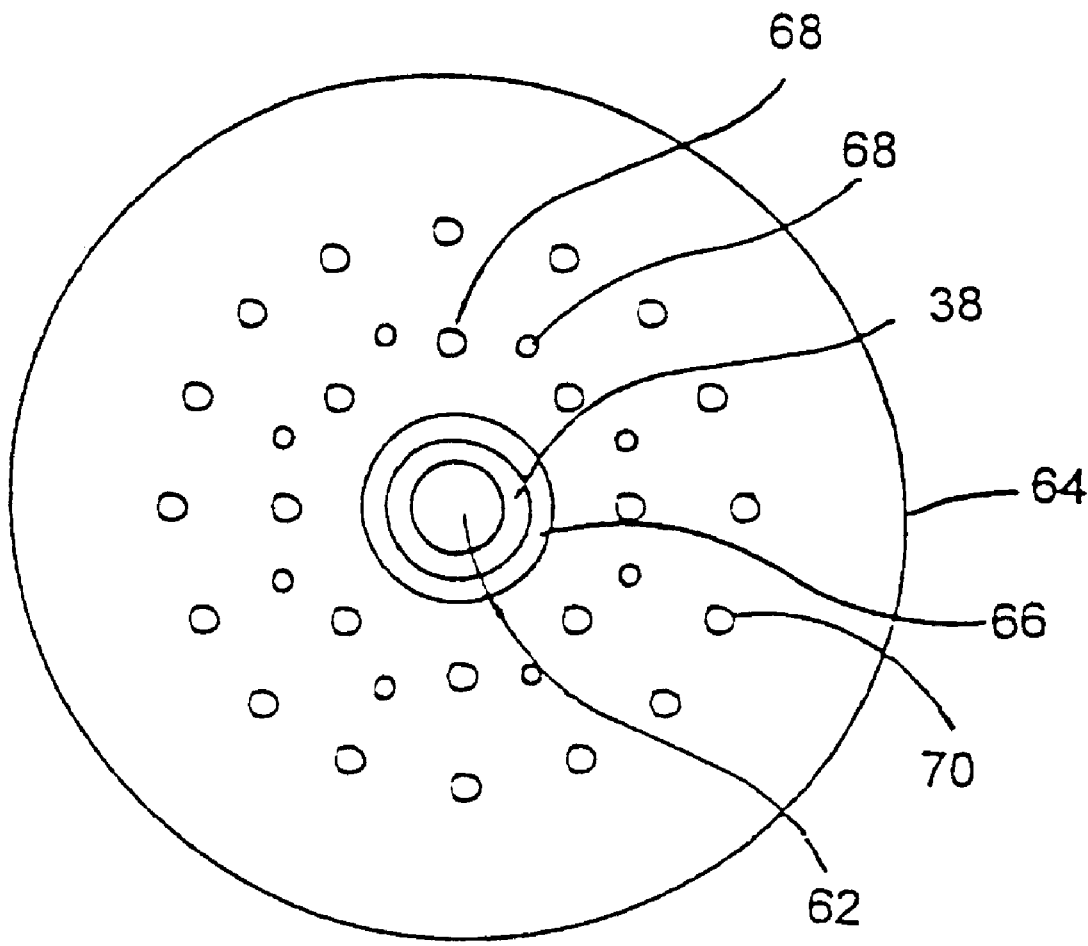
FIG. 3 is a top plan view of a face plate of the burner shown in FIG. 2.

Face plate 64 (FIGS. 2 and 3) of burner 12 includes a circular aperture 66 that surrounds nozzle 42 of atomizer 38 that is in communication with second region 26, and is used to emit the inert shield gas 26 (FIGS. 1 and 2) such as nitrogen, helium or argon from source 28. Aperture 66 thus forms a concentric annular ring surrounding nozzle 42. The shield gas 26 surrounds the droplets of source liquid 22 emitted from atomizer 38, and protects the droplets of source liquid 22 from reacting with oxygen and prematurely combusting, so that the resident time of the droplets of the source liquid 22 within the combustion area 56 is increased, thereby allowing the droplets of the glass-forming mixture 22 to fully vaporize before oxidizing. Face plate 64 also includes one or more concentric rings of apertures 68 that are in communication with third region 30, and that are used to emit oxygen ($O_2$) gas which oxidizes with the glass-forming mixture 22 after the glass-forming mixture 22 has vaporized within combustion area 56. Face plate 64 also includes one or more outer concentric rings of apertures 70 that are used to emit a combination of oxygen ($O_2$) and a combustible gas which is combusted within combustion area 56 to create a methane-oxygen flame. In the present example, a fuel/oxygen mixture of $CH_4/O_2$ was used, however any suitable fuel can be used. The premix methane-oxygen flame located outside the stream of inert gas 26 within combustion area 56 enhances the vaporization of the droplets of the glass-forming mixture 22 by enhancing combustion, as well as confining the vapor stream. The glass forming mixture may include aluminum forming compounds, such as for example aluminum nitrate, aluminum sec-butoxide, or aluminum di-sec butoxide ethylacetoacetate.

In operation, glass-forming mixture 22 having a low vapor pressure is supplied in liquid form from source 24 to outer tube 40 of atomizer 38 by a gear pump (not shown), while atomizing gas 52 is supplied to inner tube 44 in a pressurized state from source 54. Atomizing gas 52 exits inner tube 44 through holes 50 at a high velocity and blows small bubbles 51 of atomizing gas 52 into glass-forming mixture 22, thereby atomizing glass-forming mixture 22 within outer tube 40 and before glass-forming mixture 22 reaches nozzle 42. Shielding gas 26 is supplied to region 16 from source 28 and substantially completely surrounds glass-forming mixture 22, thereby increasing the resident time of the droplets of glass-forming mixture 22 within combustion area 56 and allowing the droplets to fully vaporize before oxidizing. Oxygen is supplied to third region 34 from source 32 to be oxidized with glass-forming mixture 22 after glass-forming mixture 22 is vaporized. In the illustrated example, two concentric rings of holes 68 were used. The combination of oxygen and combustible gas 30 is supplied to fourth region 18 from source 32, and is ignited within combustion area 56 to vaporize glass-forming mixture 22 and to promote oxidation of vaporized particles of the glass-forming mixture 22, thereby forming glass soot 58. In the illustrated example, one concentric ring of holes 70, was used to supply the combination gas. The resulting glass soot 58 is deposited on the target bait rod or tube 59.

Alternatively, oxygen may be used as shield gas 26 emitted from second region 16. Oxygen can effectively operate as a shield gas because the particles of glass-forming mixture 22 emitted from first region 14 are in a atomized liquid state and therefore cannot yet effectively oxidize with the oxygen present within combustion area 56.

It should also be noted that when an inert gas such as nitrogen, helium or argon is emitted from second region 16 as the shielding gas 26, the combination gas of oxygen and combustible gas may be emitted from either third region 18 or fourth region 20, with an oxygen gas being emitted from the third region 18 or fourth region 20 which is not emitting the combination gas.

EXAMPLE 1

A solution consisting of 236 grams (1 mole) of $Ca(NO_3)_2$; $4H_2O$, 375 grams (1 mole) of $Al(NO_3)_3$; $9H_2O$, 730 grams (3.5 moles) of tetraethoxysilane (TEOS) and 2900 ml ethanol was prepared for making $CaO—Al_2O_3—SiO_2$ glass soot. The running conditions were:

| | |
|---|---|
| Atomizing gas | $O_2$ - 5 SLPM |
| Solution flow rate | 4.9 ml/min |
| Inner shield gas | $N_2$ - 6 SLPM |
| Oxygen in double-ring | $O_2$ - 20 SLPM |
| Premix $CH_4/O_2$ in outer ring | $CH_4$ - 10 SLPM, $O_2$ - 9 SLPM |
| Exiting orifice of atomizer | 1/32 of an inch |

EXAMPLE 2

A solution consisting of 23 grams of $Ca(NO_3)_2$, $4H_2O$, 80 grams of Aluminum di-sec-butoxide ethylacetoacetate, 85 grams of octamethylcyclotetrasiloxane (OMCTS) and 400 ml methanol was prepared for making $CaO—Al_2O_3—SiO_2$ glass soot. The running conditions were:

| | |
|---|---|
| Atomizing gas | $O_2$ - 5 SLPM |
| Solution flow rate | 4.9 ml/min |
| Inner shield gas | $O_2$ - 40 SLPM |
| Premix $CH_4/O_2$ in outer ring | $CH_4$ - 20 SLPM, $O_2$ - 20 SLPM |
| Outer ring | $O_2$ - 10 SLPM |
| Exiting orifice of atomizer | 1/16 of an inch |

EXAMPLE 3

A solution consisting of 2 grams of $Er(NO_3)_3$, $6H_2O$, 49 grams of $La(NO_3)_3$, $6H_2O$, 86 grams of Aluminum di-sec-butoxide ethylacetoacetate, 30 grams of octamethylcyclotetrasiloxane (OMCTS) and 250 ml methanol was prepared for making $Er_2O_3—La_2O_3—Al_2O_3—SiO_2$ glass soot. The running conditions were:

| | |
|---|---|
| Atomizing gas | $O_2$ - 5 SLPM |
| Solution flow rate | 4.9 ml/min |
| Inner shield gas | $O_2$ - 40 SLPM |
| Premix $CH_4/O_2$ in outer ring | $CH_4$ - 20 SLPM, $O_2$ - 20 SLPM |
| Outer ring | $O_2$ - 10 SLPM |
| Exiting orifice of atomizer | 1/16 of an inch |

The present inventive, multi-component glass soot making burner system 10 facilitates the use of low vapor pressure compounds in making glass soot by reducing the buildup of glass soot on face plate 64 of burner 12, and more specifically by reducing the clogging of the exiting orifice of the associated atomizer 38. Burner system 10 makes it possible to use low vapor pressure components in conjunction with conventional vapor deposition methods and equipment.

It will become apparent to those skilled in the art that various modifications to the preferred embodiment of the invention as described herein can be made without departing from the spirit or scope of the invention as defined by the appended claims.

The invention claimed is:

1. An apparatus for producing a glass soot used in the formation of optical fiber, comprising:
   a burner having an internal air-assisted atomizer located within said burner, said atomizer including an outer tube having a nozzle at an end thereof, and an inner tube located within said outer tube and having a closed end restricting fluid flow therethrough and defining a cylindrical sidewall having a plurality of radially extending apertures, said outer tube receiving a glass-forming mixture in liquid form, said inner tube receiving an atomizing gas, wherein said atomizing gas flows through said apertures in said sidewall of said inner tube and atomizes said glass-forming mixture as said glass-forming mixture travels through said outer tube.

2. The apparatus of claim 1, wherein said glass-forming mixture includes low vapor pressure compounds.

3. The apparatus of claim 2, wherein said glass-forming mixture includes at least one element from a group of elements consisting of alkali metals, alkaline-earth metals, rare earth metals.

4. The apparatus of claim 3, wherein said burner includes a droplet-emitting first region, a gas-emitting second region surrounding said first region, a gas-emitting third region surrounding said second region, and a gas-emitting fourth region surrounding said third region, said first region emitting said glass-forming mixture, and a combustion area in communication with said first, second, third and fourth regions, and within which said glass-forming mixture is converted into glass soot.

5. The apparatus of claim 4, wherein said second region emits an inert gas.

6. The apparatus of claim 5, wherein said inert gas includes at least one gas selected from a group of gases consisting of nitrogen, helium and argon.

7. The apparatus of claim 6, wherein said third region emits oxygen.

8. The apparatus of claim 7, wherein said fourth region emits a combination of oxygen and a combustible gas.

9. The apparatus of claim 3, wherein said second region emits oxygen.

10. The apparatus of claim 9, wherein said third region emits a combination of oxygen and a combustible gas.

11. The apparatus of claim 10, wherein said fourth region emits oxygen.

12. The apparatus of claim 1, wherein said burner includes a droplet-emitting first region, a gas-emitting second region surrounding said first region, a gas-emitting third region surrounding said second region, and a gas-emitting fourth region surrounding said third region, said first region emitting said glass-forming mixture, and a combustion area in communication with said first, second, third and fourth regions, and within which said glass-forming mixture is converted into glass soot.

13. The apparatus of claim 1, wherein said atomizing gas includes at least one gas selected from a group of gases consisting of oxygen and nitrogen.

14. The apparatus of claim 1, wherein said glass-forming mixture includes an alumina forming compound.

15. An apparatus for producing glass soot, comprising:
   a burner including an atomizer that includes an outer tube and an inner tube, said outer tube having a nozzle that defines a droplet-emitting first region, said inner tube located within said outer tube and including a sealed end and a sidewall having a plurality of holes located therein, said burning having a gas-emitting second region surrounding said first region, a gas-emitting second region surrounding said first region, a gas-emitting third region surrounding said second region, and a gas-emitting fourth region surrounding said third region, said first region emitting a glass-forming mixture, and a selected one of said third region and said fourth region emitting a combination of oxygen and a combustible gas; and a combustion area in communication with said first, second, third and fourth regions; and wherein said glass-forming mixture enters said outer tube in liquid form and is atomized by an atomizing gas entering said outer tube through said holes in said inner tube, said combustible gas is ignited to burn within said combustion area, and wherein said glass-forming mixture is vaporized and oxidized within said combustion area to form a glass soot.

16. The apparatus of claim 15, wherein said atomizing gas includes a gas selected from a group of gases consisting of oxygen and nitrogen.

17. The apparatus of claim 16, wherein said second region emits at least one inert gas selected from a group of gases consisting of nitrogen, helium and argon.

18. The apparatus of claim 17, wherein said third region emits oxygen.

19. The apparatus of claim 16, wherein said third region emits said combination of oxygen and said combustible gas, and said fourth region emits oxygen.

20. A method for decreasing soot buildup on an atomizer used for forming a glass preform, comprising the steps of:

providing a burner including an atomizer having an outer tube having a droplet-emitting first region, and an inner tube located within the outer tube having a closed end and a wall with a plurality of radially extending apertures, the burner further including a gas-emitting second region coaxially surrounding the first region, a gas-emitting third region coaxially surrounding the second region, and a gas-emitting fourth region coaxially surrounding the third region;

providing a combustion area in communication with the first, second, third and fourth regions;

supplying a glass-forming mixture to the outer tube of the atomizer;

supplying an atomizing gas to the inner tube, such that the atomizing gas flows through the apertures of the inner tube thereby atomizing the glass-forming mixture;

supplying a shielding gas to the second region;

supplying oxygen to a selected one of the third region and the fourth region;

supplying a combination of oxygen and a combustible gas to a selected one of the third region and the fourth region not supplied with the oxygen gas;

igniting the combustible gas within the combustion area for vaporizing and oxidizing the glass-forming mixture into glass soot; and forming a glass preform with the glass soot.

21. The method of claim 20, wherein said atomizing gas supplying step includes supplying a gas selected from a group of gases consisting of oxygen and nitrogen.

22. The method of claim 21, wherein said glass-forming mixture supplying step includes supplying a mixture that includes at least one element selected from a group of elements consisting of alkali metals, alkaline-earth metals and rare earth metals.

23. The method of claim 22, wherein nitrogen is supplied to the second region, oxygen is supplied to the third region, and the combination of oxygen and combustible gas is supplied to the fourth region.

24. The method of claim 23, wherein oxygen is supplied to the second region, the combination of oxygen and combustible gas is supplied to the third region, and oxygen is supplied to the fourth region.

25. The method of claim 20, wherein said glass-forming mixture supplying step includes supplying a mixture that includes an alumina forming compound.

26. A method for producing a glass soot used in the formation of optical fiber, comprising:

providing a burner having an internal air-assisted atomizer located therein and including an outer tube having a nozzle at an end thereof, and an inner tube located within the outer tube and having a closed end restricting fluid flow therethrough and defining a cylindrical sidewall having a plurality of radially extending apertures;

supplying the outer tube of the atomizer with a glass-forming mixture;

atomizing the glass-forming mixture within the outer tube of the atomizer by supplying the inner tube of the atomizer with an atomizing gas such that the atomizing gas flows through the apertures of the inner tube and enters orthogonally to the flow of glass-forming mixture with the outer tube, thereby atomizing the glass-forming mixture as it passes through the outer tube.

27. The method of claim 26, wherein the burner of said burner providing step includes a droplet-emitting first region that includes the atomizer, a gas-emitting second region surrounding the first region, a gas-emitting third region surrounding the second region, and a gas-emitting fourth region surrounding the third region; and further including:

supplying a shielding gas from the second region;

supplying an oxygen gas to a selected one of the third region and the fourth region; and supplying a combination of oxygen and a combustible gas to a selected one of the third region and the fourth region not supplied with the oxygen gas;

providing a combustion area in communication with the first, second, third and fourth regions;

igniting the combustible gas within the combustion area for vaporizing and oxidizing the glass-forming mixture into glass soot; and forming a glass preform with the glass soot.

28. The method of claim 27, wherein said atomizing gas supplying step includes supplying a gas selected from a group of gases consisting of oxygen and nitrogen.

29. The method of claim 28, wherein said glass-forming mixture supplying step includes supplying a mixture that includes at least one element selected from a group of element consisting of alkali metals, alkaline-earth metals and rare earth metals.

30. The method of claim 29, wherein nitrogen is supplied to the second region, oxygen is supplied to the third region, and the combination of oxygen and combustible gas is supplied to the fourth region.

31. The method of claim 30, wherein oxygen is supplied to the second region, the combination of oxygen and combustible gas is supplied to the third region, and oxygen is supplied to the fourth region.

* * * * *

UNITED STATES PATENT AND TRADEMARK OFFICE
CERTIFICATE OF CORRECTION

PATENT NO. : 6,363,746 B1
DATED : April 2, 2002
INVENTOR(S) : Wei et al.

Page 1 of 1

It is certified that error appears in the above-identified patent and that said Letters Patent is hereby corrected as shown below:

Column 1,
Lines 11-13, delete "Signal attenuation is a major factor in the design of communication systems incorporating optical fibers. Transmission losses limit the distance between receivers.".

Column 3,
Line 8, "cross sectional" should be -- cross-sectional --.
Line 32, "1 4" should be -- 14 --.

Column 5,
Line 29, "Aluminum" should be -- aluminum --.
Line 45, "Aluminum" should be -- aluminum --.

Column 6,
Line 26, before "rare earth metals" insert -- and --.

Column 7,
Line 4, "burning" should be -- burner --.

Column 8,
Line 56, "element" should be -- elements --.

Signed and Sealed this

First Day of October, 2002

*Attest:*

*Attesting Officer*

JAMES E. ROGAN
*Director of the United States Patent and Trademark Office*